Fig. 1.

Feb. 4, 1930.   J. P. TARBOX   1,745,775
PROCESS AND APPARATUS FOR CUTTING, FOLDING, AND PRESSING GARMENT LABELS
Filed May 11, 1927   9 Sheets-Sheet 9

Inventor
John P. Tarbox
By his Attorneys
Ward Crosby & Smith

Patented Feb. 4, 1930

1,745,775

UNITED STATES PATENT OFFICE

JOHN P. TARBOX, OF PHILADELPHIA, PENNSYLVANIA, ASSIGNOR TO G. REIS & BRO., INC., OF NEW YORK, N. Y., A CORPORATION OF NEW YORK

PROCESS AND APPARATUS FOR CUTTING, FOLDING, AND PRESSING GARMENT LABELS

Application filed May 11, 1927. Serial No. 190,630.

My invention relates to a process and apparatus for cutting, folding and pressing garment labels. Garment labels are woven in the form of a tape which carries either in the form of a weaving in the body of the tape itself or in print upon the face of the woven tape the trade names, trade marks and/or other information and data commonly found on garment labels. Each tape carries in a series the data for many labels. After fabrication or/and printing, the tape is cut into label lengths between the woven or printed names, data, etc., the label ends are folded and the ends (and in some cases the body also) are pressed so as to make the ends lie flat and the body of the label smooth and neat.

The process practiced heretofore has been to cut the labels apart, move the cut label to a folding position, fold its opposite ends, thereupon moving the folded label to a pressing position and thereupon pressing the folded end, and if desired, the body of the label. This process involves a considerable number of steps, and elaborate, extended and sometimes complicated apparatus involving separately organized cutting, folding and pressing mechanisms. The initial cost of the apparatus and its maintenance are, therefore, relatively high, the number of adjustments very great inasmuch as each mechanism must be separately adjusted for various dimensions of work, and the chances of dis-arrangement and faulty operations are multiplied by the number of separate mechanisms which operate upon the product. A number of these factors and some others have been a retarding influence upon the rate of production.

The prime object of my invention is the concentration of the fabricating operations into the least possible number of steps which will constitute a rapid and certain method of operation and to concentrate or consolidate the mechanisms into the least possible number with the least resultant number of parts or the least possible adjustment for varying conditions and dimensions and the highest possible rate of production.

Other objects are the overcoming of the disadvantages above enumerated and still others, the attainment of the manifold lesser advantages which will appear in the process of acquiring the full understanding of the invention which it is the purport of this specification to give.

The method consists, particularly speaking, in performing the cutting, folding and pressing operations upon the near end of a severed label and the adjoining end of the tape from which the label has been severed, at one and the same time. This will at once be seen to be quite a different method from that above described in which the cutting, folding and pressing operations are performed upon opposite ends of a severed label and the cutting, folding and pressing are performed at different locations at different time intervals. The method further involves simultaneous cutting and folding, simultaneous folding and pressing, and simultaneous cutting and pressing and combinations of these steps together. A further feature of the method is the continuous feeding, subject to intermittent control exercised at the same location at which the cutting, folding and pressing operations are performed, and the steps of feeding and controlling are intimately related with each and all of the above steps.

The apparatus of my invention is intimately related to the method. The cutting, folding and pressing are carried out in large part by common elements variously coacting with each other to effect these individualized operations. Thus, one of the prime elements of the cutting device is embodied in connection with and forming a part of one of the prime elements of the folding mechanism. Thus, one of the prime elements of the folding mechanism is embodied in and forms a part of one of the prime elements of the pressing mechanism. Thus, conversely, parts of the pressing mechanism are embodied in and form a part of the elements of the folding mechanism. Thus further, parts of the pressing mechanism are embodied in and form a part of the feeding mechanism. These consolidated and concentrated mechanisms I arrange symmetrically to the plane normal to the series of labels in which the labels are separated from the tape, a common location for each of the several operations. In other words, this plane is a common plane of symmetry for the several mechanisms. The control mechanisms, however, are otherwise arranged except that the control is effected by means lying in the plane of symmetry and motivated by the movement of the labels transversely of the plane of symmetry.

The accompanying drawings illustrate one embodiment of my invention but there are already others and there will be more.

Method

Having reference particularly to Figs. 8 to 15, the method of my invention will be readily comprehended, these figures showing diagrammatically the method of my invention in practice. Assume a table 30 having a transverse slot 31 formed in its body. Assume an endwise reciprocating knife or cutting edge 32 located in the plane of symmetry of the aperture 31 and having its cutting edge just below the plane of the top 33—33 of the table. Assume further, a transversely extending pressing head 34 U-shaped in cross section, embracing cutting edge 32 and bearing on its upper ends by bow springs 35 a pair of folders 36 closing the margins of the aperture 31 but not the center. These bow springs are secured at their lower ends to the under side of the pressing head 34 and are so shaped and tensioned as to present the folders in the attitudes shown in Fig. 12 when the pressing head 34 is moved away from the aperture 31. Assume a means for reciprocating the pressing head at will from and toward the plane 33 of the top of table 30 and means when the head is uppermost, to stop the folders 36 with their upper faces in the plane 33—33 of the table.

Assume an overlying reciprocating plunger 36' having an under face 37 of plane form of a width somewhat greater than the aperture 31 so that when reciprocated, its plane face 37 will engage the top of table 30 and its downward movement be limited thereby. In the center of this plunger symmetrical with respect to the plane of symmetry S—S of aperture 31 and cutting edge 32 is a slotted projection 38 having a taper or rounded end the slot of which is deep enough to accommodate within it the cutting edge 32 when plunger 36' is moved by the latter to the plane 33 of the table 30. Assume transversely extending guards 39 over depending lateral support 40 from the plunger 36' and when the plunger 36' is uppermost pressing their upper surfaces to normally close the portion of aperture 31 not closed by folders 36. Assume the over-all width of guards 39 and projection 38 to be substantially the same whereby when the plunger 36' is moved downwardly, the projection 38 fills that portion of the aperture vacated by guards 39 in their downward movement.

Assume a means for feeding a strip of labels 41 over the table top 33 and between the upper pressing head 34 and the plunger 36'. Assume that this movement is substantially uniform and that it may be stopped through a control element 42 actuatable from an insignia 43 designedly placed upon the label. When the insignia 43 strikes the control element 42 in movement downwardly, it carries the element 42 downwardly with it a distance sufficient to accomplish the control. Assume further that there are means not shown incident to the accomplishment of the control instantly to remove the element 42 from the path of movement of pressing head 36' and plunger 38.

Figure 9:
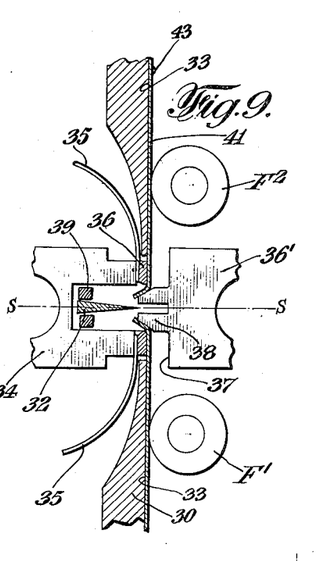
Figure 10:
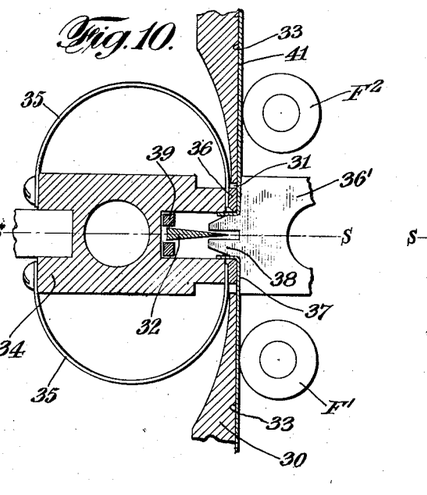

With the parts so organized when the strip of labels 41 is progressed downwardly by any suitable feeding mechanism, when the insignia 43 between each pair of adjacent labels strikes the element 42, that element is moved by the progress of the label strip through its control range. The element 42 has a normal position in advance of the plane of symmetry S—S substantially equal to its control range of movement, so that when it has accomplished that movement, the insignia 43 lies substantially in the plane of symmetry S—S directly above the cutting edge 32. Instantly the member 42 is withdrawn from the path of movement of the plunger 38. By virtue of the control movement of member 42 a cyclical movement of the parts diagrammed is started. First, the pressing head 36' and plunger 38 are projected inwardly. The first contact of plunger 38 with the body of strip 41 as shown in Fig. 9 presses the strip against the cutting edge 32, then severs it, the guards 39 having been lowered with the plunger 38. Movement of the pressing head 36' to the face of the table 30 turns the severed ends through 90° as shown in Fig. 10 and at the same time, presses and clamps the bodies of the labels upon the table 30 and upon the tops of the folders 36 which have not yet moved from position and are held in the plane of the table against suitable stops, not shown.

Figure 11:
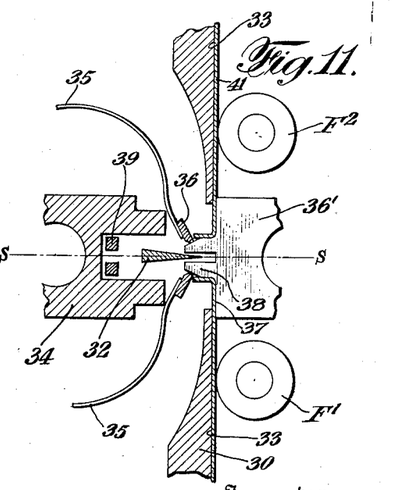

Next in the cycle of operations, the lower pressing head 34 is moved outwardly to the position shown in Fig. 11. The folders 36 move with it and at the same time are relatively moved by their mounted springs 35 to the inclined position shown in Fig. 11, where their sharpened ends incline to and make contact with the nose of the plunger 38 just beneath the extremities of the downturned ends of the adjacent labels.

Figure 12:
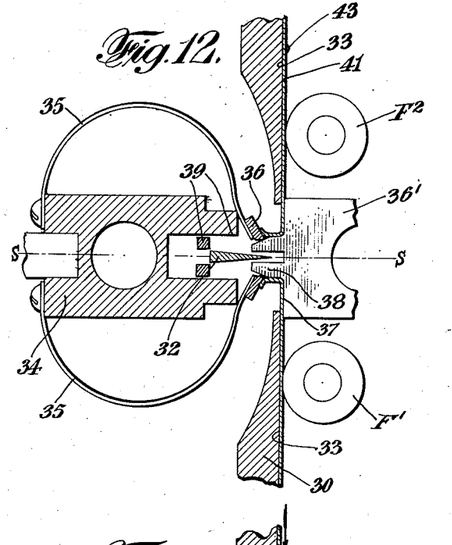
Figure 13:
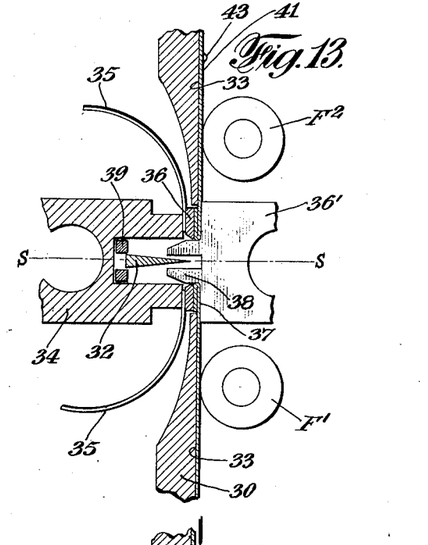

Then the pressing head 34 is moved inwardly to return it to its normal position. At the outset of this phase of the cycle the pointed edges of the folders 36 engage under the extremities of the ends of the labels as shown in Fig. 12 and commence turning them away from the plunger 38 and back toward the bodies of the labels. As the plunger continues its inward movement, the label ends are turned back to an increasing degree, sliding upon the upper surfaces of the folders 36 until when the pressing head 34 again reaches its normal position as shown in Fig. 13, the downturned label ends have been completely folded back upon the bodies of the labels, and the folding operation is complete.

At this stage the folded back label ends are hot pressed between the heated pressing face 37 of the upper pressing head 36' and the upper faces of the folders 36.

Figure 1:
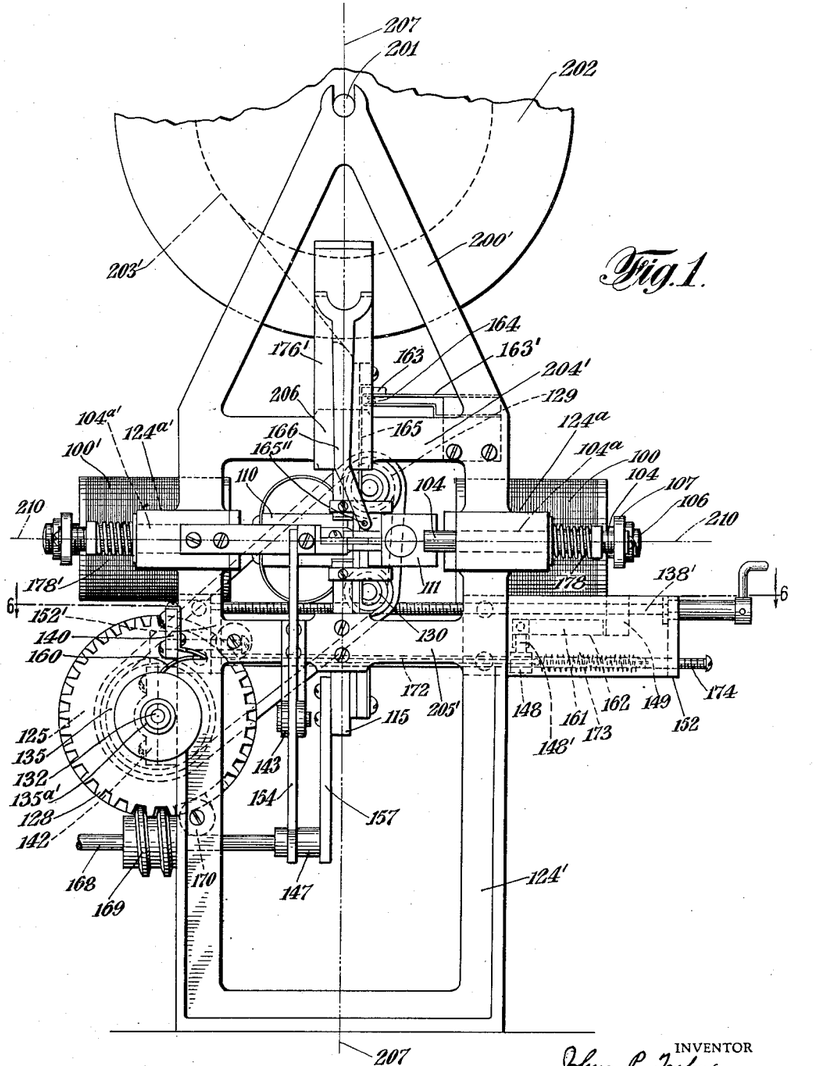
Figure 1 is a side elevation of the left hand side of the machine, the front of the machine lying at the right of the figure.
Figure 14:
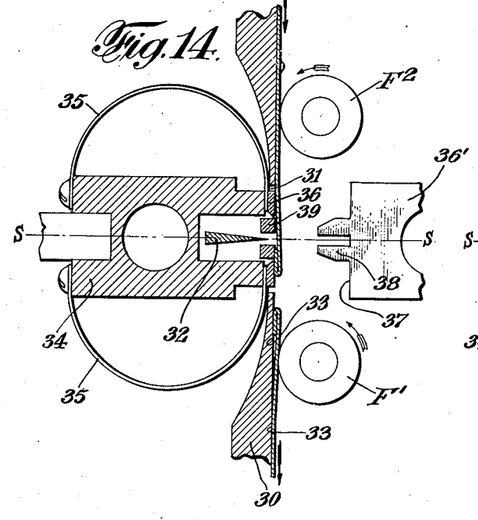

After suitable dwell, the cycle again changes by the outward recession of the upper pressing head 36' to the position shown in Fig. 14, a position substantially the same as in Fig. 1, the normal position. This frees the folded ends of adjacent labels so that the lower label, which has been now completed, due to the folding of its left hand end, can be ejected and so that the label strip 41 carrying the completely folded end can be progressed downwardly to complete a second label.

Such a progression downwardly is the next step in the cyclical movement of the cycle and is shown as having been instituted in Fig. 14. The completed label at the bottom of Fig. 14 is being discharged from a feed roll F¹, while the label strip is being progressed by another feed roll F² on the opposite side of the plane of symmetry S—S.

Figure 15:
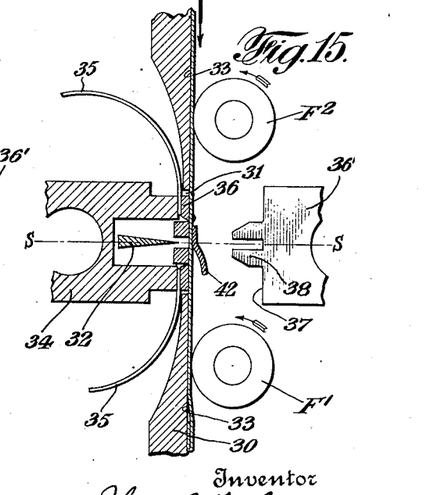

After the incompleted label has moved a measured distance (measured by any suitable means) to prevent interference of the insignia of the label design with the control element 42, the cycle returns the control element 42 to control position as shown in Fig. 15. Such a control is through and by virtue of the distance traveled by the label.

While reference has been made to the relative position and movements of the heads 36' and 34 to the table 30 as being "inwardly" and "outwardly", and positions with respect to the plane S—S have been referred to relative to a vertical direction, this has been done merely with specific reference to the present embodiment of the device, in which the table is arranged vertically. It is to be understood that in other embodiments the table may be placed horizontally, or in an intermediate position, and the heads 36' and 34 in such an instance will be respectively above and below the table. In fact a modified form of machine embodying applicant's general principle is so being constructed. It is therefore obvious that no restriction is to be placed on such specific terms as are herein used, but these terms are to be understood broadly as being merely relative with respect to the specific embodiment shown; and are therefore used as words of description and not as words of limitation.

In Figs. 1 to 6 is shown one form of apparatus by which my invention may be carried out. In this form I have delineated the elements assumed to be used in the method described with reference to Figs. 8 to 15, substantially of the form shown in connection with Figs. 8 to 15, but it is to be understood that the forms of these elements may be varied in many ways. In other words, the method can be practiced by devices of many descriptions.

*Apparatus*

The apparatus is carried by a framework composed of a pair of spaced and open substantially rectangular uprights 124—124' from the upper end of which project triangular extensions 200—200' adapted at their upper ends to removably support a shaft 201 which carries a reel 202 upon which a roll of labels 203 may be wound and suitably fed to the mechanisms which are carried by the frame. The shaft 201 is located substantially on the vertical center line of the machine and may be removed simply by lifting it vertically upward from the slots in which it rests.

Figure 2:
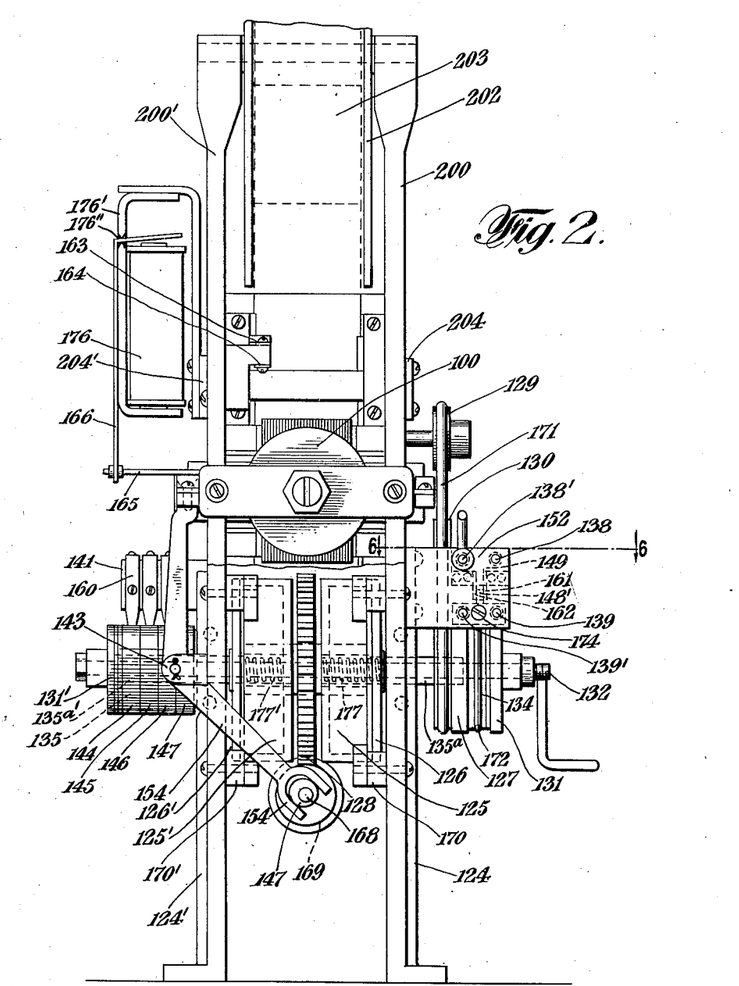
Fig. 2 is a front elevation thereof; with certain parts broken away.
Figure 4:
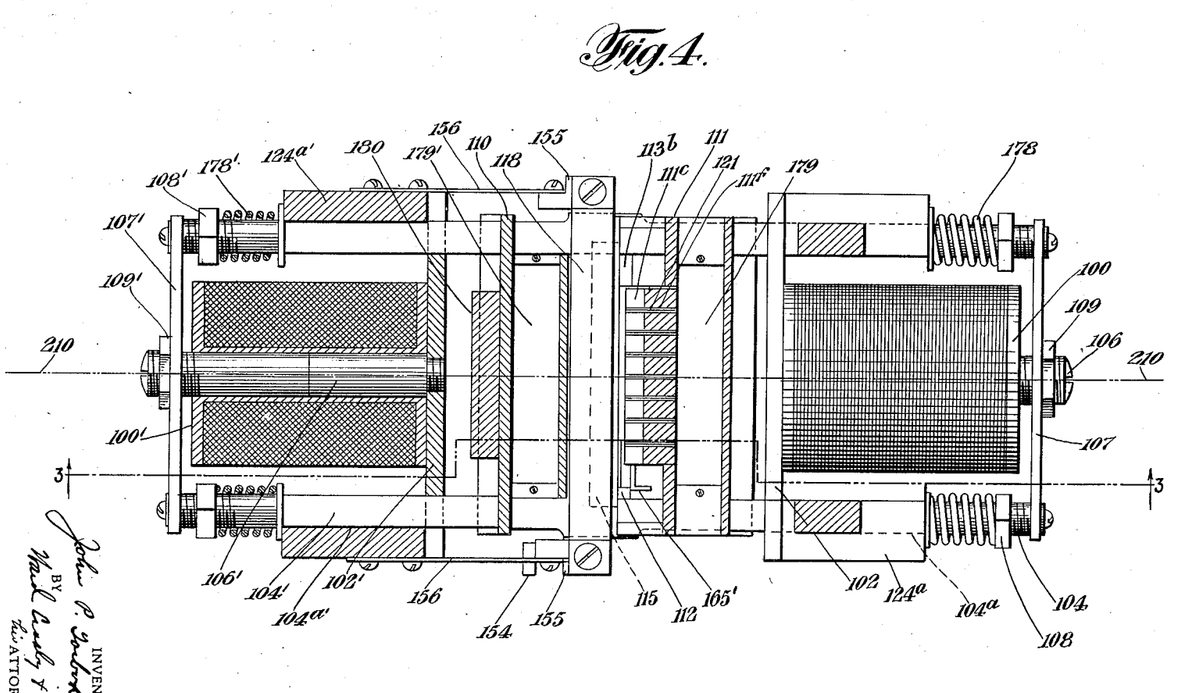
Fig. 4 is a central horizontal section substantially on line 4—4 of Fig. 3.
Figure 5:
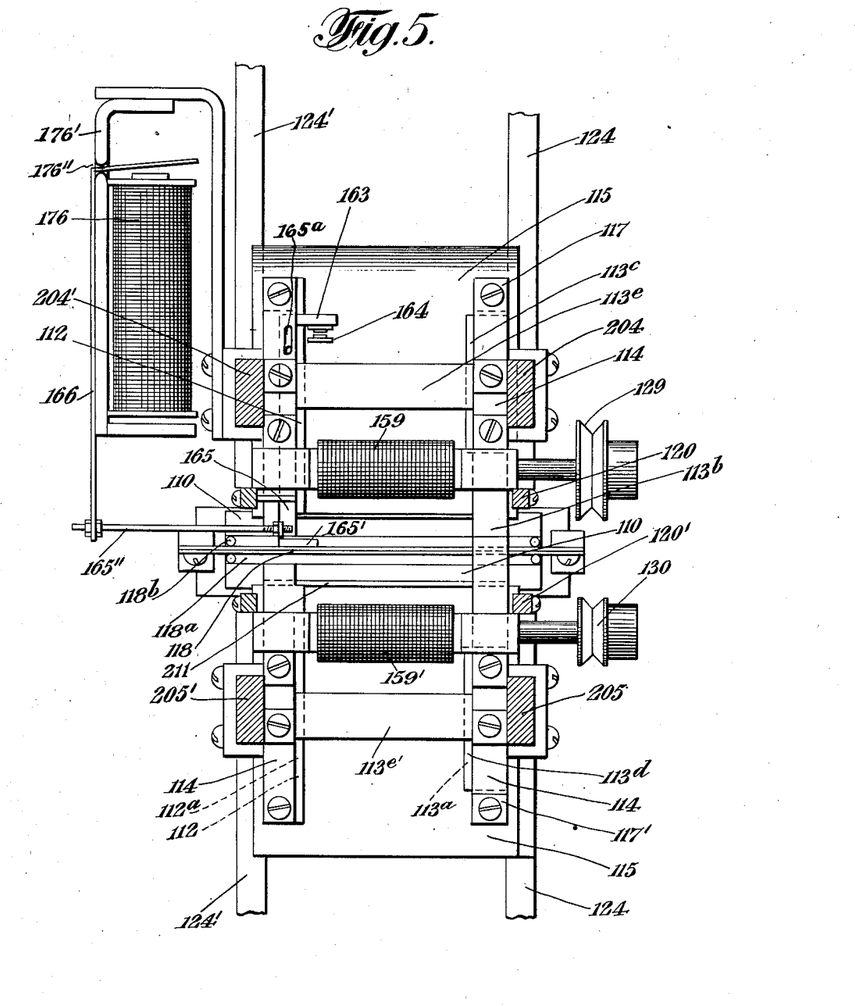
Fig. 5 is the substantially transverse section on line 5—5 of Fig. 3.

Extending transversely of the upper end of the rectangular frame members 124—124' are pairs of spaced cross members 204—204', 205—205' (Figs. 1, 2 and 5). These members have central portions 206 of enlarged thickness as can be seen most readily by an inspection of Figs. 3 to 5, especially Fig. 3, these enlarged portions being symmetrically located with respect to the transverse plane passing through the center line 207—207 of Fig. 1 of the machine. This plane may be regarded as the transverse plane of symmetry of the machine but it is not the principal plane of symmetry as we shall see. The thickened sections 206 are interiorly slotted at 208 of Figs. 3 and 4 and in the slots are mounted the upper and lower sections of a feed table 115. The table 115 is in the form of a flat plate having its edges entered into the slot 208 and secured thereto by means of screws 209 tapped in from the outside of the frame. The opposite sides of the frame 124 are thus spaced apart and secured together through the body of the table 115.

Intermediate the upper cross members 204—204' (Fig. 1) and the lower cross members 205—205' of the frame is located a horizontal plane of symmetry 210—210 which is the principal plane of symmetry of the machine. It lies at right angles to the plane of the right hand or top face of the feed table, the feed table in this instance being vertically arranged. In its center the feed table is provided with a symmetrically arranged transverse aperture 211 (Fig. 3 and Fig. 5), the ends of the table being cut squarely off at the borders of this aperture. This appears clearly in Fig. 3. The width of this aperture is a little in excess of four times the width of the fold to be made on the label end, for example, if the fold be 5/32" wide, then the width of the aperture 211 in the table will be slightly in excess of 20/32" or 5/8".

Arranged to the right of the tables is the upper pressing head 111 having the plane pressing face 111$^a$ of a width in excess of the width of the aperture 211 so that when the pressing head is moved down to the left to contact with the table 115, its edges rest on the margins of the aperture 211 and press the label between them and the plane face 111$^a$. The pressing head 111 is provided with an aperture 111$^b$ to carry an electrical heating cartridge 179 (Fig. 4) to keep the head hot. Projecting from this face 111$^a$ to the left is a plunger 111$^c$ of less width than the face 111$^a$ and approximately twice the width of the fold on the end of the label. Thus, for example, if the fold be 5/32", this width would be 10/32" or approximately 3/8". This plunger has a tapered front end and a somewhat rounded nose to provide for easy entry into engagement with the label. It is transversely slotted at 111$^d$ in the plane of symmetry.

This upper pressing head 111 is borne on the inner ends of a pair of rectangular section bars 104 (Figs. 1, 3 and 4) carried slidably one in each side of frame 124 in the plane of symmetry 210. Bars 104 are mounted in channeled guide ways 104$^a$ in the enlarged sections 124$^a$ of the frame. Their inner ends enter slot 111$^e$ in the pressing head 111 and are secured therein in alignment with the guide ways 104$^a$ by any suitable means (not shown). Thus, the pressing head 111 may be reciprocated toward and from the table 115.

Means for reciprocating the head consist of an electromagnet 100 of the solenoid type. This electromagnet is carried in the plane of symmetry by means of a cross bar 102, the ends of which are secured by any suitable means to the enlarged portions 104$^a$ of the frame 124—124', but are slotted to permit the free passage of the supporting bearings 104. The movable armature 106 of the solenoid 100 (Fig. 4) is connected with the outer ends of the bar 104 by means of a yoke 107 the ends of which are screwed to the outer ends of the bars. The connection of the yoke 107 with the element 106 is adjustable to permit an adjustable throw or reciprocation of the pressing head 111. The outer ends or members 104 are rounded and screw threaded and surrounding them are spiral springs 178 confined against the outer ends of enlargements 104$^a$ by adjusting nuts 108, the nuts 108 being threaded onto bars 104. They constitute adjustable retractive springs for the pressing head 111. Thus, the pressing head 111 may be projected into contact with table 115 under the pull of the electromagnet 100 and retracted therefrom when the magnet is de-energized by the springs 178.

Figure 3:
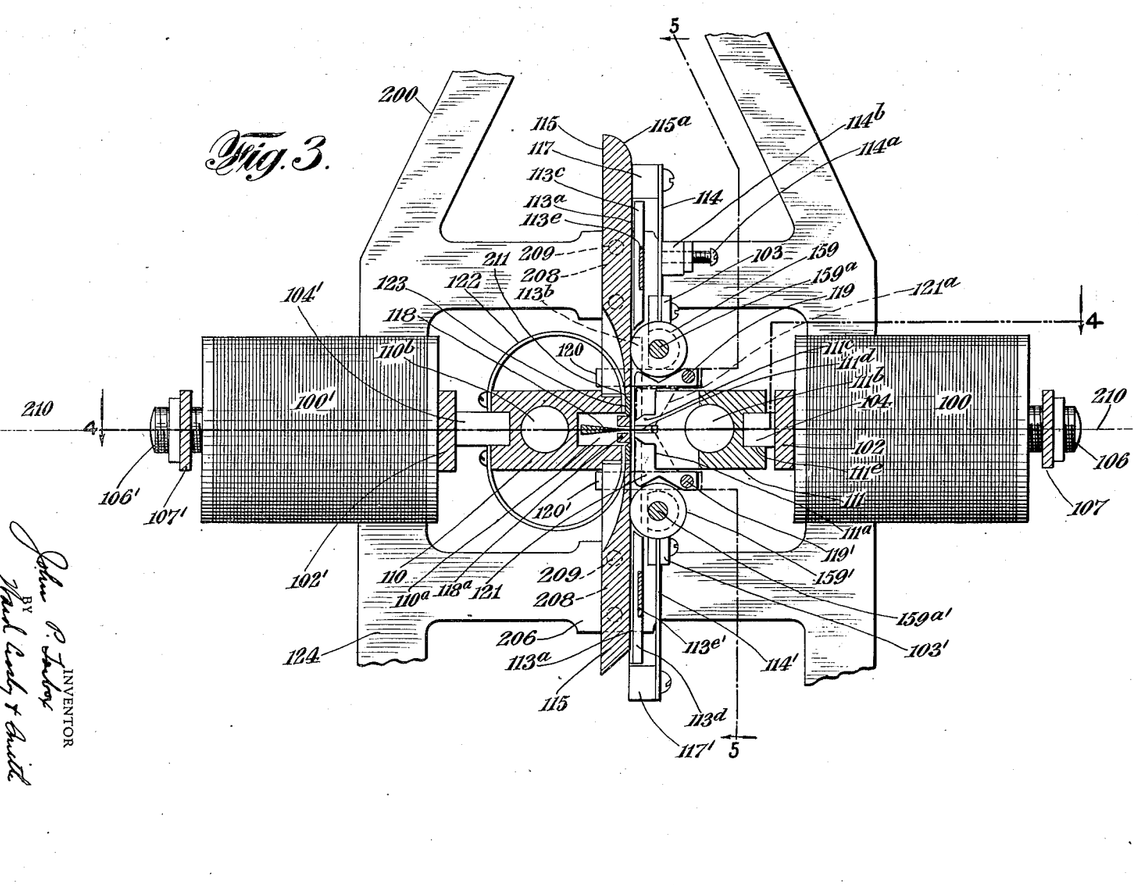
Fig. 3 is a partial central longitudinal vertical section on line 3—3 of Fig. 4.

Also located in the principal plane of symmetry 210, on the left or under side of the table 115 is a lower pressing head 110 (Figs. 3 to 5). This head, like the upper pressing head 111, is of a width in excess of the width of the table aperture 211 and normally engages the under side of the table. Also like the right hand or upper pressing head 111, it is reciprocable from and toward the table by means of its mounting upon bars 104' mounted in guide ways 104$^{a'}$ in enlargement 124$^{a'}$ of the frame 124—124' on the left of the machine. Actuation is by means of an entirely similar and similarly numbered arrangement of electromagnet armature, yoke, etc.

But the pressing head 110 is of distinctly different construction from the pressing head 111. Its upper end is of a width almost that of the aperture 211 and projects almost through it. Centrally, it is provided with a relatively wide and deep slot 110$^a$ (Fig. 3), a slot of a width somewhat greater than the width of the plunger 111$^c$ on the upper pressing head 111 and sufficient to accommodate the plunger quite freely. On each side of this slot on its end it bears a folder 123. The folders are in the form of transversely extending metal strips which are borne by the plunger up against overlying stops 112—113$^b$ (Fig. 5) which retain their right-hand or upper faces in the plane of the top of the feed table 115. They are of a width somewhat less than the width of the distance between the sides of plunger 111$^c$ and the edges of aperture 211 when the plunger is moved downwardly, so that the plunger may be projected freely between them. Their inner and juxtaposed margins are beveled, as clearly appears, to produce a sharpened edge in the plane of the table 115. These folders are not secured to the upper end of the plunger, but are secured each to a spaced pair of bow springs 122, the distant end of which is juxtaposed and secured to the left or under side of the pressing head 110. These springs are so adjusted that they tend to rotate the folders 123 about their outer edges and to bear them inwardly toward the plunger 111ᶜ whereby the sharpened inner edges are contacted with the plunger 111ᶜ at a substantial angle thereto and at an acute angle to the plane of symmetry. But the actuating electromagnet 100' is of sufficient power to overcome not only the tension of retracting springs 178' but also the tension of the springs 122 and normally to retain the folders 123 against their stops 112—113ᵇ as shown in Fig. 3.

The pressing head 110 is provided with an aperture 110ᵇ in which is located another electric cartridge heater 179' which heats the head and through it the folders 123.

Lying in the transverse plane of symmetry is a cutting edge 118 in the form of a transversely reciprocating blade, the edge of which lies just below the plane of the top of the feed table 115. This cutting edge is freely reciprocable in the wide and open slot 110ᵃ. These ends project laterally free of the opposite sides of the framework 124 and are there mounted through suitable connecting blocks 155 (Fig. 4) upon the ends of leaf springs 156 anchored to the enlarged portions 124ᵃ' of the frame.

Overlying the upper face of the feed table are a pair of feed rolls 159—159' carried on transversely extending shafts 159ᵃ—159ᵃ'. The feed rolls are symmetrically placed with respect to the plane of symmetry 210, one on each side of and very close to the upper pressing head 111. They are preferably composed of leather discs or some other suitable friction material mounted in any suitable manner upon the shafts 159ᵃ—159ᵃ'. They are borne in bearing blocks 103—103' supported on the ends of leaf springs 114—114', anchored to blocks 117—117' carried at opposite sides and edges of the table 115 close to the margins of the table. Set screws 114ᵃ are passed through lugs 114ᵇ projected inwardly from the frame 124 and bear upon the upper sides of leaf springs 114 and serve to tension the rolls 159. Drive pulleys 129—130 free of the frame of the machine serve for driving these rolls (Figs. 1, 2 and 5).

On each side of table 115 are the stops 112—113ᵇ (Fig. 5) for the folders 123. These stops are also guides for the edges of labels being fed over the face of table 115 by means of rolls 159—159', for they extend from one end of the table to the other across the aperture 211, and are provided on their juxtaposed edges with undercut slots 112ᵃ—113ᵃ adapted to receive the edges of the labels and hold them against the face of the table. Guide and stop 112 on one side of the table, (on the left of Fig. 5), is fixed in place and in one piece. The guide and stop on the opposite side of the table, (on the right of Fig. 5), is made in sections and some of its sections are adjustable toward and from the opposite or fixed guide. Thus, the center part 113ᵇ is fixed constituting the fixed stop for the folders 123, but the upper and lower parts 113ᶜ and 113ᵈ are slidably mounted laterally upon bars 113ᵉ—113ᵉ' which project across the face of the table from their anchorage on top of the fixed guides 113ᵇ (on the right of Fig. 5) and appearing in Fig. 3.

The upper end of the table 115 is rounded as at 115ᵃ to permit the label to be passed unobstructedly over it and into the undercut grooves 113ᵃ, etc. The margins adjoining slot 211 are undercut in the regions of springs 122 to accommodate them freely (Fig. 3). The lower end may be suitably shaped to permit free discharge of completed labels. On each side of the undercut portions and without the borders of plungers 111—110 are erected pillars 120—120' having a slotted and screwed on connection with the side of the table for adjustment. These pillars bear between them transversely extending rods 119—119' lying respectively between the feed rolls 159—159' and the sides of the pressing head 111. These rods support with their lower edges parallel to but slightly removed from the face of table 115 a plurality of stripper plates 121 (Figs. 3 and 4) in vertically extending slots 111ᵗ in pressing head 111. Normally the plunger 111ᶜ of the pressing head has its nose within the margins of these stripper plates 121. The plates are cut away at the center as at 121ᵃ to avoid fouling the cartridge heater B and at their ends to follow the closely set feed rolls 159—159'. Their engaging edges are rounded adjacent the rollers to prevent catching the labels upon them.

The slot 110ᵃ in the under pressing head 110 is on opposite sides of cutting edge 118 normally closed by a pair of symmetrically disposed cutting edge guards 118ᵃ (Figs. 3 and 5) supported at their opposite ends by pins 118ᵇ (Fig. 5) depending from the under or left side of the pressing head 111 and supporting the bars 118ᵃ from without the stops 112—113. These guards with the folders 123 close aperture 211 normally, and with the stripper plates 121 form a feed throat through which labels to be operated upon are projected by the feed rolls 159—159'.

Figure 6:
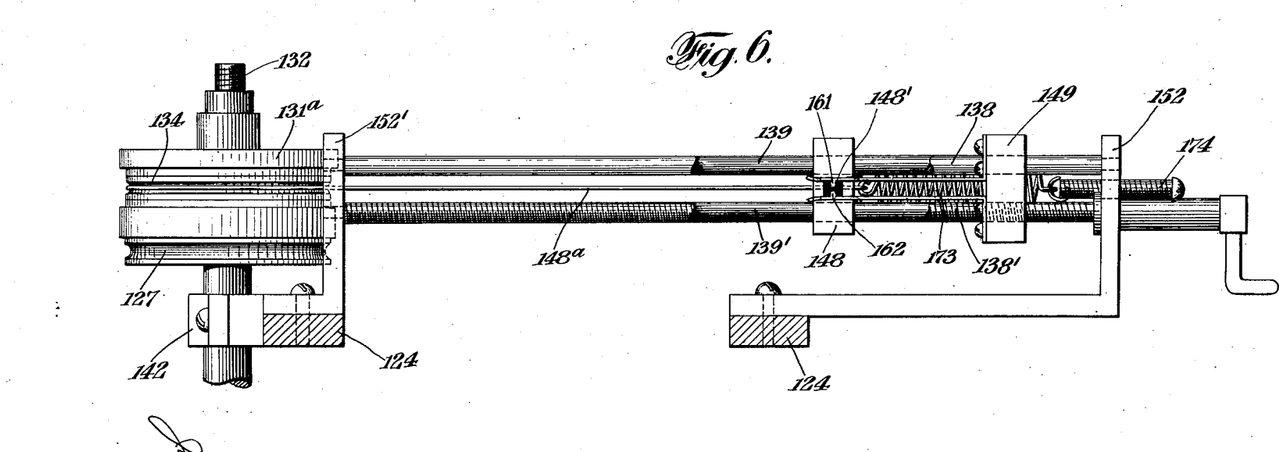
Fig. 6 is a section on line 6—6 of Fig. 1.

These several mechanisms are carried through a cyclical series of operations by their relation to and operation from a control shaft 132 which extends transversely of the machine as shown in Figs. 1, 2 and 6. This shaft is journaled in bearings 142 carried from the rear upright portions of the frame 124—124' (Fig. 1) below the plane of symmetry. The shaft is rotated by a worm and screw gear connection 169—128 (Fig. 1) with a high speed motor driven shaft 168 extending transversely thereof and journaled at one end in bearing member 157 depending from the lower end of table 115. From this high speed shaft also is operated the reciprocating cutting edge 118. Operation is by means of an eccentric 147 engaging the forked lower end of a bell crank 154 pivoted on bracket 143 on cross bar 205' and having its upper forked end straddling and making a pointed engagement with one of the leaf springs 156 which (Fig. 4) supports the cutting edge 118. Thus, as long as the high speed shaft 168 is rotated, not only is shaft 132 rotated regularly, but also the cutting edge 118 is reciprocated at a high rate period.

Figure 7:
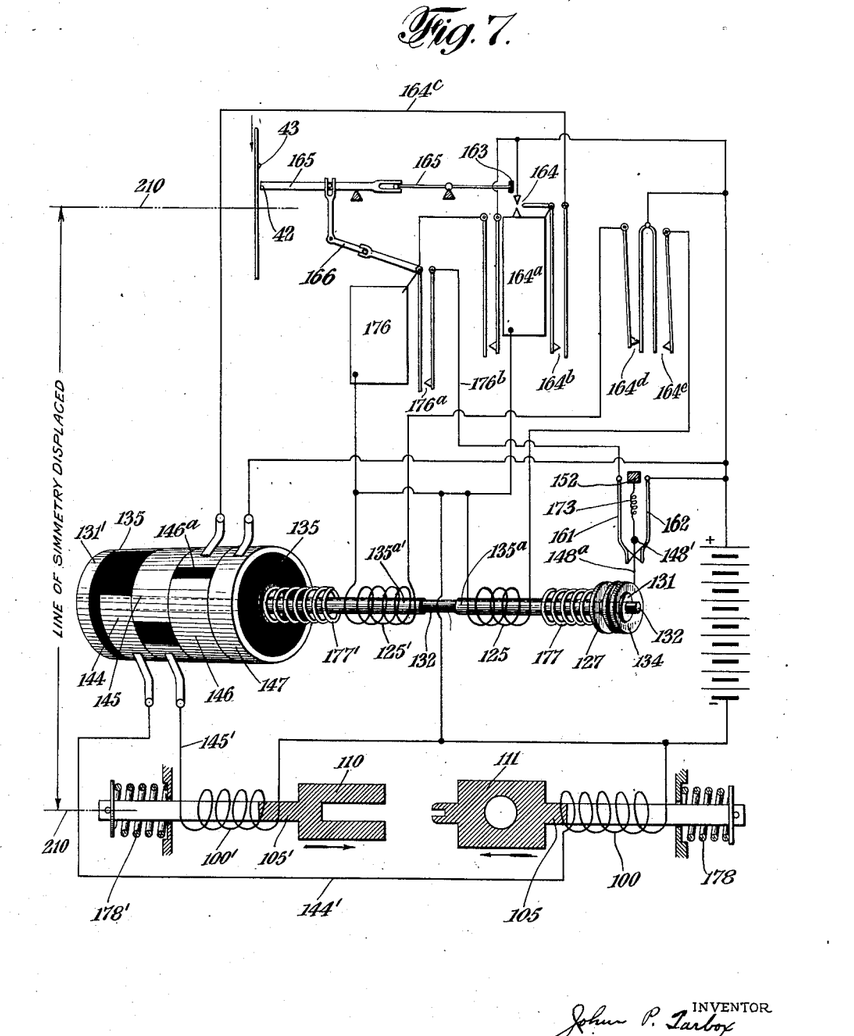
Fig. 7 is a diagrammatic illustration, showing the electrical circuit connections together with certain mechanical parts.

On one end, shaft 132 carries rotatably a cylinder 135 of insulating material adapted to be clutched into and out of engagement with the shaft and rotated or not rotated with it accordingly. This cylinder carries four contact rings 144—145—146—147, which are in respective edge-to-edge contact. Cooperating with these rings are four contact brushes 160 carried by a block of insulating material 141 projecting laterally from the one of the rear uprights of the frame and overlying the cylinder 135. Having reference to Fig. 7, the two end contact rings 144, 145 and the two corresponding brushes are connected, respectively, with the electromagnets 100—100' which actuate the pressing heads 111—110. The rings, as clearly appears in Fig. 7, are not continuous but each carries a small gap which marks the break of the circuit of the corresponding electromagnet. The rings are adjustable about their axes and are angularly so set and the gaps, therefor, relatively so positioned, and so dimensioned, that if the cylinder is rotated, first, the electromagnet 100 of pressing head 111 is actuated to project the pressing head into contact with the table, then to retain it in such contact, then to break the circuit of electromagnet 100' which holds the head 110 to the under side of the table, to thereby allow spring 178' to retract head 110, then to remake it and reproject head 110 into contact with the underside of the table and then after a suitable interval to reopen the circuit of magnet 100 controlling the pressing head 111 and to permit that plunger to be retracted to normal position. These movements occupy a complete revolution of the cylinder 135.

Referring also to Figs. 1 and 2, this cylinder 135 is fixed upon a sleeve 135ᵃ' projecting concentrically with shaft 132 through supporting bearing 142. The inner end of sleeve 135ᵃ' bears an armature 126' of an iron clad electromagnet 125' carried upon blocks 170' from the inner face of the adjacent frame 124. The outer end of shaft 132 has fixed thereon a disc 131' adjacent the outer end of cylinder 135 against which the outer end of cylinder 135 is adapted to be thrust by spring 177' when the magnet 125' is deenergized. In such case shaft 132 rotates cylinder 135 and with it the contact rings just described carrying them through the cycle. On the opposite side of the worm gear 128 from the mechanism just described is a second iron clad electromagnet 125 of essentially the same description and the parts of which are similarly designated. The sleeve 135ᵃ connected with this magnet, however, connects with a different clutch mechanism. This mechanism comprises a pulley member 127 supported on the end of the sleeve 135ᵃ, a clutch disc member 131 fixed to the outer end of shaft 132 and an intermediate freely floating member 134 having rubber or other friction faces on the sides thereof. When pulley member 127 is released by its electromagnet, its retracting spring 177 bears it against clutch members 134 and 131 and the pulley member is driven from shaft 132 as is also the member 134. Rotation is transmitted by a belt 171 to the pulleys 129 and 130 which drive the feed rolls 159—159'.

Figure 8:
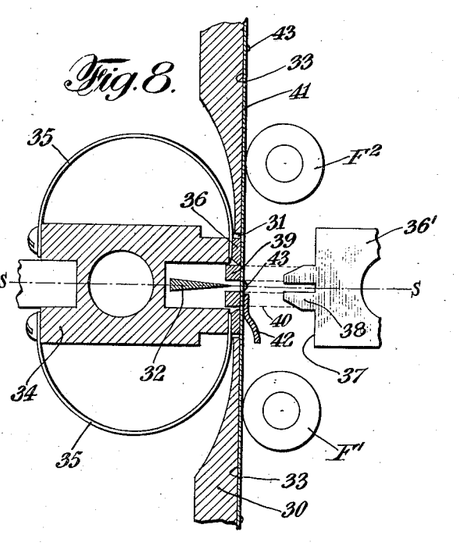
Figs. 8 to 15 are diagrammatic views showing the various steps of the method as carried out by the machine.

These parts are started through a cyclical movement by a control element 165 appearing particularly in Figs. 1 and 5 (and diagrammatically illustrated also in Fig. 7). This element is in the form of a metal strip mounted in suitable guides overlying the top of the stop and guide 112 and reciprocable longitudinally of this guide. Its mounting consists of a pin and slot connection 165ᵃ with the upper end of the guide. Its lower end projects laterally over the path of movement of labels upon the upper face of the table 115 and just in advance of the plane of symmetry 210 in such manner that a label insignia engaging it will move its engaging edge into that plane of symmetry as shown in Fig. 8 above described (where it is designated diagrammatically as 42). Its upper end is provided with an electrically insulated projection 163 adapted to close together a pair of electrical contacts 164. Its lower end is provided with a link connection 165" and 166 to the armature of an electromagnet designated as 176. This magnet upon energization will instantly withdraw the engaging end 165' (Fig. 4) of the member 165 from the path of movement of the labels and of the plunger 111ᶜ which is operated upon it.

The pivotal connection and the parts cooperating with the control element 165 are constructed and positioned in the following manner. The control element 165 is attached to and adapted to move with a rod 165" (Fig. 5) which extends outwardly and is attached to the lower end of the bell crank armature 166, which is pivotally supported in the notches 176" formed in the bracket 176', which supports the solenoid 176. The arm 165 is supported from a leaf spring 163' (Fig. 1) and is slidably engaged and guided by the guard 112 and the slot and pin connection 165ᵃ, which permit it an upward and downward movement and a limited sidewise movement at its lower end 165'. The slot and pin connection, designated as 165ª, comprises a slot formed in the guard 112 and a pin projecting from the arm 165. Accordingly the contact 163 and arm 165 are normally held supported as shown in Fig. 5 by means of the leaf spring 163' (Fig. 1); which permits the contact 163 to be moved into engagement with the contact 164 upon a downward movement of the arm 165.

It will therefore be seen that when the end 165' is moved downwardly (Fig. 5) as by engagement with a raised portion of the tape, the arm 165 will be moved downwardly, overcoming the influence of spring 163' and moving the contacts 163 and 164 into engagement; and also that upon energization of the magnet 176 the armature bell crank 166 will be swung in a clockwise direction about its pivotal support 176", thereby pulling the rod 165" outwardly to move the control element 165' out of the path of movement of the label.

Referring more particularly to Fig. 7, one of the pair of contacts 164 connects with a battery or other source of power, the other connects with an electromagnet 164ª. This magnet, not shown in the drawings, other than this diagram, may be located at any suitable point about the machine. It functions as a general circuit closer. Upon energization it locks itself by way of contacts 164ᵇ, conductor 164ᶜ, and ring 146 upon cylinder 135 through ring 147 to positive battery. Ring 146 is almost continuous having but a small break 146ª sufficient to break the circuit after one complete revolution of cylinder 135. Magnet 164ª also instantly closes the circuit of magnet 176 which, as we have seen, functions to remove the element 165 from the path of movement of the labels. This magnet closes a locking circuit for itself through contacts 176ª and conductor 176ᵇ to a pair of contacts 161, 162 which connects it to the positive lead of the battery.

It will be noted that in Fig. 7 the line of symmetry 210 has been displaced into two positions, solely for the purpose of simplicity in showing the apparatus diagrammatically.

Referring to Figs. 1, 2 and 6; the pair of contacts 161—162 are carried by a block of insulating material 149, which depends from a pair of shafts 138—138' mounted in brackets 152—152' on the right of the machine, (as shown in Fig. 2). The shaft 138' has a screw threaded connection with a block 149 such that the position of contacts 161—162 can be adjusted longitudinally of the shafts 138—138', merely by turning the crank on the outer end of the shaft 138' (see Fig. 1). Coacting with this pair of contacts is a contact dis-engaging pin 148' carried in a block 148 freely slidable on a pair of shafts 139—139' mounted in the same brackets 152—152' immediately below the shafts 138—138'. The arrangement of shafts, contacts, blocks and pin is symmetrical about a plane which passes through the clutch member 134 associated with the feed pulley 127. A flexible connection 148ª wound over the clutch member 134 extends from its top in the plane of the two lower shafts 138—138' to the block 148, and a tension spring 173 in the same plane adjustably and resiliently connects the block with the bracket 152 at the outer ends of the shaft 138. Thus, when the clutch 134—131ª, 127 is operated, the block 148 is drawn along the shafts 139—139' until its contact pin engages and separates the normally closed contacts 161, 162; and when this clutch is released the spring 173 retracts the block 148 to thereby withdraw the pin 148' and hence allow the points 161—162 to again come into contact.

Reverting again to Fig. 7, magnet 164ª when energized, opens the circuit of the clutch magnet 125, the one which controls the feed, and closes the circuit of the other magnet 125', the one which controls the cyclical rotation of the cylinder 135. This is done by way of the make or break contacts 164ᵈ—164ᵉ, controlling, respectively, the clutch magnets 125' of the cylinder 135, and 125 of the feed clutch.

Operation

Now the operation of the machine will be most readily apprehended. The end of the roll of labels 203 is entered over the face of the table 115 under the guides 112—113ᶜ, the guide 113ᶜ being adjusted to the width of the label at that time. The free end of the label is entered under the upper feed roll 159, the feed roll being momentarily turned by hand for this purpose, and the feed roll further turned to project the free end through the feed throat between the pressing heads and into feeding engagement with the lower feed roll 159'. The machine is then ready for operation. The shaft 138' is then turned to adjust contacts 161—162 to such point that they are disengaged at such time as the feed of the labels by rolls 159 has almost but not quite brought a dividing insignia between the labels into the plane of symmetry. The lower guide 113ᵈ is also adjusted, to the width of the label, if desired, though this is not essential.

The power now being turned on, the rolls 159—159' continue to feed the label forward, but due to the preliminary adjustment, the division insignia 43 promptly engages the end of the control element 165 and draws its engaging edge into the plane of symmetry 210, whereupon contacts 164 are closed, magnet 164ª is energized, energizing magnet 176 over the circuit traced, instantly removing the control element 165, energizing the feed control magnet 125 and in the same instant, stopping the feed, deenergizing cycle control magnet 125' in the same instant starting the rotation of the cycle controlling cylinder 135. Immediately there follows an energization over circuit 144, 144', etc. of the magnet 100 which projects the upper pressing head 111 toward the face of the table and into engagement with it. Plunger 111ª tensions the label across the cutting edge 118, reciprocating cutting edge 118 severs it as the plunger passes and the edge enters the slot in the head of the plunger, and the severed label ends are turned through 90° over the sharpened edges of the folders 123. Immediately, thereafter the lower pressing head 110 has its magnet 100' deenergized over circuit 145, 145', etc. and moves away from the under side of the table, permitting the folders to take every fold engaging position as shown in Figs. 10, 11, and 12. Immediately thereafter, this magnet is again energized from its ring 145 and is projected back into engagement with the under side of the table, folders 123 going through the movement indicated in Figs. 12 and 13, and completing the fold started by the plunger 111ª, and finally and firmly pressing the fold between them and the plane face of the upper pressing head. Then after a length of time suitable for the heat of the pressing heads to fix the fold, the closed circuit of the magnet 100 governing the pressing head 111 is opened at its ring 144 and that head is retracted, again opening the throat of the machine for the free passage of a new label. Immediately following this, or indeed, almost simultaneously, the cylinder 135 completes its rotation and opens at 146ª the locking circuit of the magnet 164ª. This magnet instantly reverses the energization of the cylinder and feed control magnets 125' and 125, energizing the cylinder control magnet 125' and deenergizing the feed control magnet 125, stopping the cylinder and starting the feed. Instantly, the label strip is fed forward by the resultant rotation of the feed rolls 159. But the feed control element 165 is still without the path of movement of the label, for magnet 176 is locked by its contacts 176ª, conductor 176ᵇ, and contacts 161—162. Not until contacts 161—162 are parted by pin 148' will this magnet be deenergized. Quickly the feed progresses to such a point that the design insignia of the label has passed or substantially passed the plane of symmetry where the control element must engage, and then the pin 148' in block 148 engages the contacts 161—162 and the magnet 176 is deenergized, reprojecting the end 42 of the control element 165 into the path of movement of the division insignia 43 of the label.

There it is engaged by the succeeding division insignia, and the cycle of operation just described is repeated.

Here we have a machine which fulfills all the objects of my invention, a machine light, simple, compact, few in parts, cheap to manufacture, extremely rapid in its operations, highly efficient in its effects, producing a product of the highest grade and of the most accurate shape and dimension. Here we have a machine upon which there are but two adjustments once the machine is normally in operation, the one, the adjustment for the width of the label between the guides 112 and 113ᶜ, and the other, the adjustment of block 149 by means of which the label engagement of the control element 165 is made dependent upon the distance traveled by the label, the design and insignia are jumped over and the control element is engaged only by division insignia.

Modifications of which my invention is capable without departing from its generic spirit, in view of the basic nature of the method, are probably many in number. Each and every one of them not departing from the generic spirit of my invention is to be comprehended within the scope of the appended claims.

What I claim as new and useful and desire to protect by Letters Patent is:

1. The method of preparing the ends of garment labels for attachment to garments which consists in delivering the labels for preparation in tape form and initiating by the said label delivery a cyclical controlled operation comprising severing the labels from the tape one by one, and simultaneously preparing the adjacent ends of the adjacent labels severed.

2. The method of preparing the ends of garment labels for attachment to garments which consists in delivering the labels for preparation end to end and simultaneously folding the adjacent ends of adjacent labels throughout their width simultaneously.

3. The method of preparing the ends of garment labels for attachment to garments which consists in delivering the labels for preparation end to end and simultaneously folding and pressing the adjacent ends of adjacent labels throughout their width simultaneously.

4. The method of preparing the ends of garment labels for attachment to garments which consists in delivering the labels for preparation end to end and simultaneously cutting apart and pressing the adjacent ends of adjacent labels throughout their width simultaneously.

5. The method of preparing the ends of garment labels for attachment to garments which consists in delivering the labels for preparation end to end and simultaneously cutting, folding and pressing the adjacent ends of adjacent labels throughout their width simultaneously.

6. The method of preparing the ends of garment labels for attachment to garments which consists in presenting the labels for preparation in connected series, simultaneously preparing the adjacent ends of adjacent labels, the said preparation being initiated by the presentation of the ends to be prepared.

7. The method of preparing the ends of garment labels for attachment to garments which consists in presenting the labels for preparation in connected series, simultaneously preparing the adjacent ends of adjacent labels, the said preparation being initiated by the presentation of the ends to be prepared, and making a fresh presentation of the next succeeding adjacent ends through and by virtue of the completion of the preparation of the preceding adjacent ends.

8. A machine of the character described comprising a label cutting and folding mechanism arranged about a common plane of symmetry transverse to the labels cut, and means for reciprocating said folding mechanism in a plane normal to the plane of said labels.

9. A machine of the character described comprising label cutting and pressing mechanism arranged about a common plane of symmetry transverse to the labels as cut, said cutting and pressing mechanism being reciprocable along the axis of symmetry, and means for causing said reciprocation.

10. In a machine of the character described, a reciprocating label pressing head and a label cutting element reciprocated simultaneously with said head in a direction transverse to the reciprocation of said pressing head.

11. In a machine of the character described, a label pressing head having an engaging surface of plane form and a label cutting element projecting from the face of said pressing head and movable with respect to said pressing head.

12. A machine of the character described comprising a label cutting knife relatively fixed in position in one direction and reciprocable in another direction, a label pressing head, and means carried by and moved with the head in its pressing operation to sever the label upon the relatively fixed cutting edge.

13. A machine of the character described, a folding element comprising a flattening element in the form of a plunger having an extended end serving as a label severing element.

14. A machine of the character described comprising a feed table having a transverse aperture therein, means to feed labels over the table across said aperture, a cutting edge arranged in the transverse plane of symmetry of said table aperture, a lower folding and pressing device reciprocable into and out of position to close the margins of said aperture and comprising folding means movable into the plane of the feed table, and an upper reciprocating folding and pressing head having a plane face reciprocable into and out of engagement with the face of the table adjoining the aperture and having a folding plunger adapted to simultaneously project into and out of the open portion of the aperture, which plunger is slotted to receive the cutting edge when the pressing head moves toward the table.

15. A machine of the character described, a cutting and folding mechanism operating in a common plane of symmetry and a feeding mechanism having a feed control element operating approximately in the plane of symmetry.

16. A machine of the character described comprising label feeding devices symmetrically arranged with respect to a plane of symmetry transverse to the line of feed of the labels, and a feed control element operating approximately in the plane of symmetry.

17. A machine of the character described, label cutting mechanism, label feeding devices on each side of the label cutting mechanism which devices coact with each other to hold the labels in tension during the cutting operation and means for folding the cut labels, said folding means being arranged between said feeding devices and being operable intermittently relative thereto.

18. A machine of the character described, a label feeding mechanism comprising a pair of spaced feeding devices, a label cutting mechanism operating intermediate the feeding devices transversely of the label to tension the same between the feed devices and means for folding the cut labels, said folding means being arranged between said feeding devices and being operable intermittently relative thereto.

19. A machine of the character described comprising label folding mechanism and label cutting mechanism, feeding devices on opposite sides of said mechanisms adapted to tension labels to be operated upon between them, the exit one of which feeding devices feeds at a greater rate than the entrant one.

20. A machine of the character described, cutting and folding mechanism, and coacting feeding mechanism together with a control element for the feed mechanism, which control element is governed by the progress of the label to cutting and folding position.

21. A machine of the character described for operating upon label tape bearing design insignia, cutting and folding mechanism, a feeding mechanism, a feed control element operating in the plane of the cutting and folding mechanism, means to remove the feed control element from said plane governed by the progress of the label to a cutting and folding position, means to replace the feed control element into its travel plane, which last means is governed by the distance traveled by the label whereby the control element is not interfered with by the design insignia.

22. A machine of the character described for operating upon label tape bearing design insignia, label cutting and folding mechanism, a feeding mechanism, and a feed control element therefor governed by the distance traveled by the label whereby the design insignia will not interfere with the feed control element.

23. The method of feeding labels which consists in establishing a uniform progression of labels independently of label insignia and establishing division insignia control in accordance with the distance traveled by the labels.

24. A machine of the character described for operation upon label tape, cutting and folding mechanism under cyclical control, and an element governed by the travel of the tape itself to cut in the cycling control.

25. In a machine of the character described, cutting and folding mechanism having cyclical movement, a feeding mechanism to feed the labels to the cutting and folding mechanisms, means governed from the label and by the distance the label is fed to start the cutting and folding mechanism upon this cycle, means to render the feed control inoperative at the opening of the cycle, cycle controlled means to strop the cycle, cycle controlled means to re-initiate the feeding, and means governed independently of the label and by the distance the labels are fed to restore the feed control element to its normal government by the label itself.

26. In a machine of the character described, the combination of a feed table over which labels are to be fed, first and second cooperating means on respectively opposite sides of the label feeding plane and reciprocable toward and from each other, cutting means operable substantialy adjacent the feeding plane, and means for operating said first and second means and said cutting means to cut and fold adjacent edges of adjacent labels.

27. In a machine of the character described, the combination of a feed table over which labels are to be fed, first and second cooperating means on respectively opposite sides of the label feeding plane and reciprocable toward and from each other, cutting means operable substantially adjacent the feeding plane and within the confines of said first and second means, and means for operating said first and second means and said cutting means to cut and fold adjacent edges of adjacent labels.

28. In a machine of the character described, the combination of a feed table over which labels are to be fed, first and second cooperating means on respectively opposite sides of the label feeding plane and reciprocable toward and from each other, third means normally resiliently held between said first and second means for engaging cut ends of said labels, and means for reciprocating said first and second means to fold and press said engaged ends of said labels.

29. In a machine of the character described, the combination of a feed table having a transverse aperture therein, means to feed lables over the table across said aperture, cutting means in said table aperture, a lower folding and pressing device reciprocable into and out of position to close the margins of said aperture and comprising folding means movable into the plane of the feed table, an upper reciprocating folding and pressing head having a plane face reciprocable into and out of engagement with the face of the table adjoining the aperture and having a folding plunger adapted to simultaneously project into and out of the open portion of the aperture, and means for operating said cutting means, said folding and pressing device and said folding and pressing head to cut, fold and press adjacent ends of adjacent labels.

30. In a machine of the character described, the combination of label feeding means, two reciprocable members on respectively opposite sides of the plane of feeding, label cutting means adjacent the plane of feeding and between said reciprocable members, fold engaging means resiliently held between said reciprocable members and movable with one of said members, said reciprocable members and said fold engaging means being so formed and positioned as to fold adjacent ends of adjacent labels, and means for operating said reciprocable members and cutting means in timed cyclic order to cut and fold adjacent ends of adjacent labels.

31. In a machine of the character described, the combination of a folding element having a flattened surface in the form of a plunger having an extended end serving to deflect the severed edges of adjacent labels, and cooperating reciprocable means for folding said deflected ends of adjacent labels.

In testimony whereof I have signed my name to this specification.

JOHN P. TARBOX.